E. A. LELAND.
T COUPLING FOR PIPES AND HOSE.
No. 173,308. Patented Feb. 8, 1876.
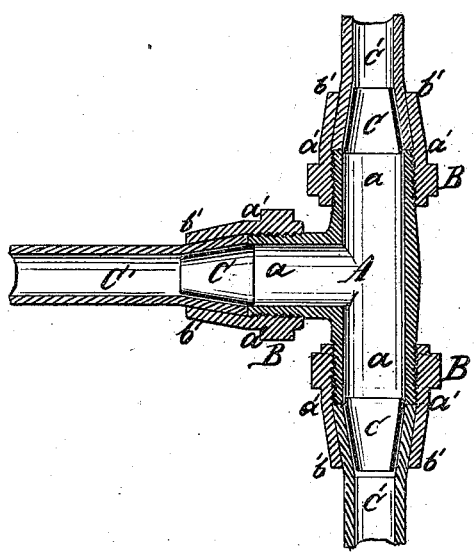
Witnesses:
Ernst Bilhuber
H. Wells Jr
Inventor:
Edwin A Leland
per James A Whitney
Atty.

UNITED STATES PATENT OFFICE

EDWIN A. LELAND, OF NEW YORK, ASSIGNOR OF ONE-HALF HIS RIGHT TO LEONARD RICHARDSON, OF BROOKLYN, NEW YORK.

IMPROVEMENT IN T-COUPLINGS FOR PIPES AND HOSE.

Specification forming part of Letters Patent No. 173,308, dated February 8, 1876; application filed January 10, 1876.

*To all whom it may concern:*

Be it known that I, EDWIN A. LELAND, of the city, county, and State of New York, have invented an Improvement in T-Couplings for Pipes and Hose, of which the following is a specification:

This invention comprises a T-coupling constructed with tapering nuts, and combined with thin internal bracing-thimbles, separate and detachable from the aforesaid coupling, whereby the sections of pipe to be coupled are firmly held against all tendency to slip from the nuts, whereby the said sections are enabled to make a butt-joint with the ends of the aforesaid coupling, and whereby three or more sections of pipe may be joined at less cost, both as concerns the manufacture of the coupling devices and the operation of coupling or joining the pipes than has been found practicable with any of the T-couplings previously devised.

The drawing represents a central longitudinal sectional view of a T-coupling made according to my invention.

A is the externally-threaded portion or body of a common T-coupling, which, being well known, and fully shown in the drawing, requires no specific description. B are the nuts that, in the usual manner, are screwed upon the threaded branches $a$ of the body or portion A aforesaid; but these nuts, instead of being of the usual form, are tapered at their outer portions, as shown at $a'$ $b'$. C are sheet-metal thimbles, so termed, for convenience of description. These thimbles are tapering, as shown in the drawing, the degree of taper corresponding to that of the outer portions $a'$ $b'$ of the nuts B.

The pipe-sections to be joined are indicated at C', and preliminary to such joining the ends to be coupled are enlarged to a tapering form by means of any suitable implement. Previous to this, however, the nuts B should be slipped upon the sections C', so that when the ends of the pipe-sections aforesaid are enlarged, as just set forth, the said ends will fit snugly within the tapering outer portions of the nuts. The thimbles are then inserted within the enlarged and tapering ends of the pipe-sections, and the ends of said sections are then butted against the ends of the branches $a$ of the body or part A, and the nuts B are then screwed upon the branches $a$.

The thimbles C being internally provided, as shown, brace the expanded ends of the pipe-sections against the inward pressure of the tapering end portions $a'$ $b'$ of the nuts, and the said ends of the sections being griped between the internal thimbles and the tapering end portions, aforesaid, of the nuts are united to the portion or body A by butt-joints, so termed.

It will, of course, be understood that the said portion or body may, if desired, have more than three branches, $a$, in order to connect more than three pipe-sections.

I am aware that T-couplings have been proposed, in which the part or body A has been cast with branches tapering at their extremities for insertion in the enlarged and tapering ends of pipe-sections, and used in connection with tapering nuts; but these being cast and made in one piece necessitated a thickness of metal that rendered their proper insertion in the pipe-sections a matter of great difficulty, and, moreover, being cast, and with the usual rough surface of brass-castings, either failed to make a tight joint with the pipe-section, or necessitated turning in a lathe before being, even in a moderate degree, fitted for use.

Such were wholly different from my invention and could not secure the results secured by my said invention, in which latter internal thimbles, distinct from the body A, of thin smooth sheet metal, support the ends of the pipe-sections against the inward pressure of the nuts, said thimbles being capable of manufacture at a comparatively infinitesimal cost, involving no change in the ordinary structure of the portion or body A, and enabling persons comparatively unskilled to join the pipe-sections as snugly and securely as, by methods or devices previously known, could be done by skillful plumbers at a far greater expense. T-couplings, therefore, comprising in their construction, tapering ends cast upon, and in one with, the portion or body A, (as just hereinbefore explained,) I do not claim; but What I do claim as my invention is—

The thin, detachable, internal bracing-thimbles C, in combination with the portion or body A, and the nuts B, of a T-coupling, the nuts B being made tapering at their outer portions $b'$ $a'$, substantially as described, for the purpose set forth.

EDWIN A. LELAND.

Witnesses:
 H. WELLS, Jr.,
 WM. A. J. TUNNEY.